(12) United States Patent
Zhang

(10) Patent No.: US 12,368,309 B1
(45) Date of Patent: *Jul. 22, 2025

(54) CHARGING STAND WITH SUPPORTING BAFFLE PORTION FIXEDLY CONNECTED TO CHARGING STAND MAIN BODY

(71) Applicant: Renlong Zhang, Guangdong (CN)

(72) Inventor: Renlong Zhang, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,296

(22) Filed: Nov. 4, 2024

Related U.S. Application Data

(63) Continuation-in-part of application No. 18/783,226, filed on Jul. 24, 2024, now Pat. No. 12,176,743.

(51) Int. Cl.
*H01M 10/46* (2006.01)
*H02J 7/00* (2006.01)

(52) U.S. Cl.
CPC .......... *H02J 7/0044* (2013.01); *H02J 7/0013* (2013.01)

(58) Field of Classification Search
CPC ....... H02J 7/0013; H02J 7/0044; H02J 7/0042
USPC ................................. 320/107, 114, 115, 116
See application file for complete search history.

(56) References Cited

U.S. PATENT DOCUMENTS

| | | | |
|---|---|---|---|
| 12,176,743 B1* | 12/2024 | Zhang | H02J 7/0013 |
| 2019/0027944 A1* | 1/2019 | Grzybowski | H02J 7/0044 |

* cited by examiner

*Primary Examiner* — Edward Tso

(57) ABSTRACT

A charging stand includes a charging stand main body and a support baffle portion. The support baffle portion includes a first support baffle, a second support baffle and a third support baffle, and the first support baffle is connected with the charging stand main body. The second support baffle is connected with the charging stand main body. The third support baffle is connected with the charging stand main body, the third support baffle is located between the first support baffle and the second support baffle, a first charging placement space is formed between the third support baffle and the first support baffle, and a second charging placement space is formed between the third support baffle and the second support baffle. A first spacing is formed between the third support baffle and the first support baffle, a second spacing is formed between the third support baffle and the second support baffle.

19 Claims, 7 Drawing Sheets

CHARGING STAND WITH SUPPORTING BAFFLE PORTION FIXEDLY CONNECTED TO CHARGING STAND MAIN BODY

CROSS-REFERENCE TO RELATED APPLICATIONS

This application is a Continuation-in-Part of the U.S. application Ser. No. 18/783,226 filed on Jul. 24, 2024, and entitled "CHARGING STAND" now pending, the entire disclosures of which are incorporated herein by reference.

TECHNICAL FIELD

The present disclosure relates to the field of charging tools, in particular to a charging stand.

BACKGROUND

At present, mobile electronic equipment, such as mobile phones and tablet computers, has been widely used, and has become essential electronic equipment for everyone. However, the power of electronic equipment is limited. When the power of electronic equipment is exhausted, the electronic equipment needs to be charged in time. However, the charging tool in the current market is free of space for placing the electronic equipment, especially when a plurality of electronic equipment needs to be charged at the same time, the electronic equipment is scattered everywhere and not tidy, and is also inconvenient for users to store when being charged, so that the user experience is greatly affected. Therefore, there is an urgent need in the market to provide a charging stand that can place and store a plurality of electronic equipment at the same time to improve the user experience.

SUMMARY

In order to overcome the shortcomings of the prior art, the present disclosure provides a charging stand.

The charging stand, includes:
a charging stand main body; and
a support baffle portion, wherein the support baffle portion includes a first support baffle, a second support baffle and a third support baffle, and the first support baffle is connected with the charging stand main body; the second support baffle is connected with the charging stand main body; the third support baffle is connected with the charging stand main body, the third support baffle is located between the first support baffle and the second support baffle, a first charging placement space is formed between the third support baffle and the first support baffle, and a second charging placement space is formed between the third support baffle and the second support baffle; a first spacing is formed between the third support baffle and the first support baffle, a second spacing is formed between the third support baffle and the second support baffle, and the first spacing is different from the second spacing.

As an improvement of the present disclosure, a baffle mounting portion is arranged on the charging stand main body, and the baffle mounting portion is used for mounting the support baffle portion.

As an improvement of the present disclosure, the baffle mounting portion includes a plurality of first mounting parts, and the first mounting parts are located between the first support baffle and the third support baffle.

As an improvement of the present disclosure, the baffle mounting portion also includes a plurality of second mounting parts, and the second mounting parts are located between the second support baffle and the third support baffle.

As an improvement of the present disclosure, the first mounting part is a first mounting slot position.

As an improvement of the present disclosure, the second mounting part is a second mounting slot position.

As an improvement of the present disclosure, the baffle mounting portion also includes a third mounting part, a fourth mounting part and a fifth mounting part, the first support baffle is connected with the charging stand main body through the third mounting part, the second support baffle is connected with the charging stand main body through the fourth mounting part, and the third support baffle is connected with the charging stand main body through the fifth mounting part.

As an improvement of the present disclosure, the third mounting part is a third mounting slot position, the fourth mounting part is a fourth mounting slot position, the fifth mounting part is a fifth mounting slot position, the first support baffle is detachably inserted in the third mounting slot position, the second support baffle is detachably inserted in the fourth mounting slot position, and the third support baffle is detachably inserted in the fifth mounting slot position.

As an improvement of the present disclosure, the first support baffle and the charging stand main body are integrally formed, the second support baffle and the charging stand main body are integrally formed, and the third support baffle and the charging stand main body are integrally formed.

As an improvement of the present disclosure, the first spacing is smaller than the second spacing, and the spacing ranges of the first spacing and the second spacing are 0.5 mm to 100 mm.

As an improvement of the present disclosure, the height of the third support baffle is different from the height of the first support baffle.

As an improvement of the present disclosure, the height of the third support baffle is different from the height of the second support baffle.

As an improvement of the present disclosure, the height of the second support baffle is different from the height of the first support baffle.

As an improvement of the present disclosure, the height ranges of the first support baffle, the second support baffle and the third support baffle are 1 mm to 100 mm.

As an improvement of the present disclosure, the charging stand main body is a plastic charging stand main body or a bamboo charging stand main body or wooden charging stand main body or a metal charging stand main body.

As an improvement of the present disclosure, the first anti-skid portion and the second anti-skid portion are both connected with the charging stand main body, the first anti-skid portion is arranged between the third support baffle and the first support baffle, and the second anti-skid portion is arranged between the third support baffle and the second support baffle.

As an improvement of the present disclosure, the power module is electrically connected with the control main board; an accommodating cavity is formed around a side wall of the charging stand main body, and the power module and the control main board are arranged inside the accommodating cavity; a side wall of the charging stand main body is provided with a power output port group, and the power output port group is electrically connected with the power module and the control main board.

As an improvement of the present disclosure, the power output port group includes a plurality of first power output ports and a plurality of second power output ports, and the first power output ports and the second power output ports are different types of power output ports.

As an improvement of the present disclosure, the first power output port is a first USB power output port, and the second power output port is a TYPE-C power output port.

As an improvement of the present disclosure, the support baffle portion is connected with an upper surface of the charging stand main body, and a third spacing is formed between the support baffle portion and a left edge and/or a right edge and/or a front edge and/or a rear edge of the upper surface; and the lower side of the support baffle portion is connected with the charging stand main body, and a slot is formed in the upper side of the support baffle portion.

As an improvement of the present disclosure, a side wall of the charging stand main body is also provided with a switch, and the switch is electrically connected with the power module and the control main board.

As an improvement of the present disclosure, the side wall of the charging stand main body is also provided with a charging port, and the charging port is electrically connected with the power module and the control main board.

As an improvement of the present disclosure, the first anti-skid portion is a first rubber anti-skid portion or a first silicone anti-skid portion or a first plastic anti-skid portion, and the second anti-skid portion is a second rubber anti-skid portion or a second silicone anti-skid portion or a second plastic anti-skid portion.

As an improvement of the present disclosure, the first anti-skid portion and the second anti-skid portion are both integrally formed with the charging stand main body.

As an improvement of the present disclosure, the first anti-skid portion and the second anti-skid portion are both detachably connected with the charging stand main body.

As an improvement of the present disclosure, a first mounting groove and a second mounting groove are formed in the charging stand main body. The first anti-skid portion is arranged in the first mounting groove, and the second anti-skid portion is arranged in the second mounting groove.

As an improvement of the present disclosure, each of the first anti-skid portion and the second anti-skid portion is provided with a plurality of anti-skid bulges.

As an improvement of the present disclosure, the charging stand main body includes an upper cover and a base. The upper cover is detachably connected with the base. The support baffle portion is connected with the upper cover. The power output port group, the charging port and the switch are all arranged on the base.

The present disclosure has the beneficial effects: The present disclosure provides a charging stand. The charging stand includes a charging stand main body and a support baffle portion. The support baffle portion includes a first support baffle, a second support baffle and a third support baffle, and the first support baffle is connected with the charging stand main body. The second support baffle is connected with the charging stand main body. The third support baffle is connected with the charging stand main body, the third support baffle is located between the first support baffle and the second support baffle, a first charging placement space is formed between the third support baffle and the first support baffle, and a second charging placement space is formed between the third support baffle and the second support baffle. A first spacing is formed between the third support baffle and the first support baffle, a second spacing is formed between the third support baffle and the second support baffle, and the first spacing is different from the second spacing. Thus, electronic equipment can be put in the first charging placement space and the second charging placement space by a user, and one or more electronic equipment is convenient for the user to place and accommodate. In addition, since the first spacing is different from the second spacing, different thicknesses and sizes of electronic devices can be placed in the first charging placement space and the second charging placement space. Further, when the electronic equipment needs to be supported at a certain angle by the user, as the first spacing is different from the second spacing, the support angle of the electronic equipment when being placed in the first charging placement space is different from that when being placed in the second charging placement space. The support angle of the electronic equipment is adjusted through the first charging placement space and the second charging placement space by the user, so that the content displayed in a screen of the electronic equipment is observed at different angles by the user, and the electronic equipment is used by the user when the electronic equipment is charged.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
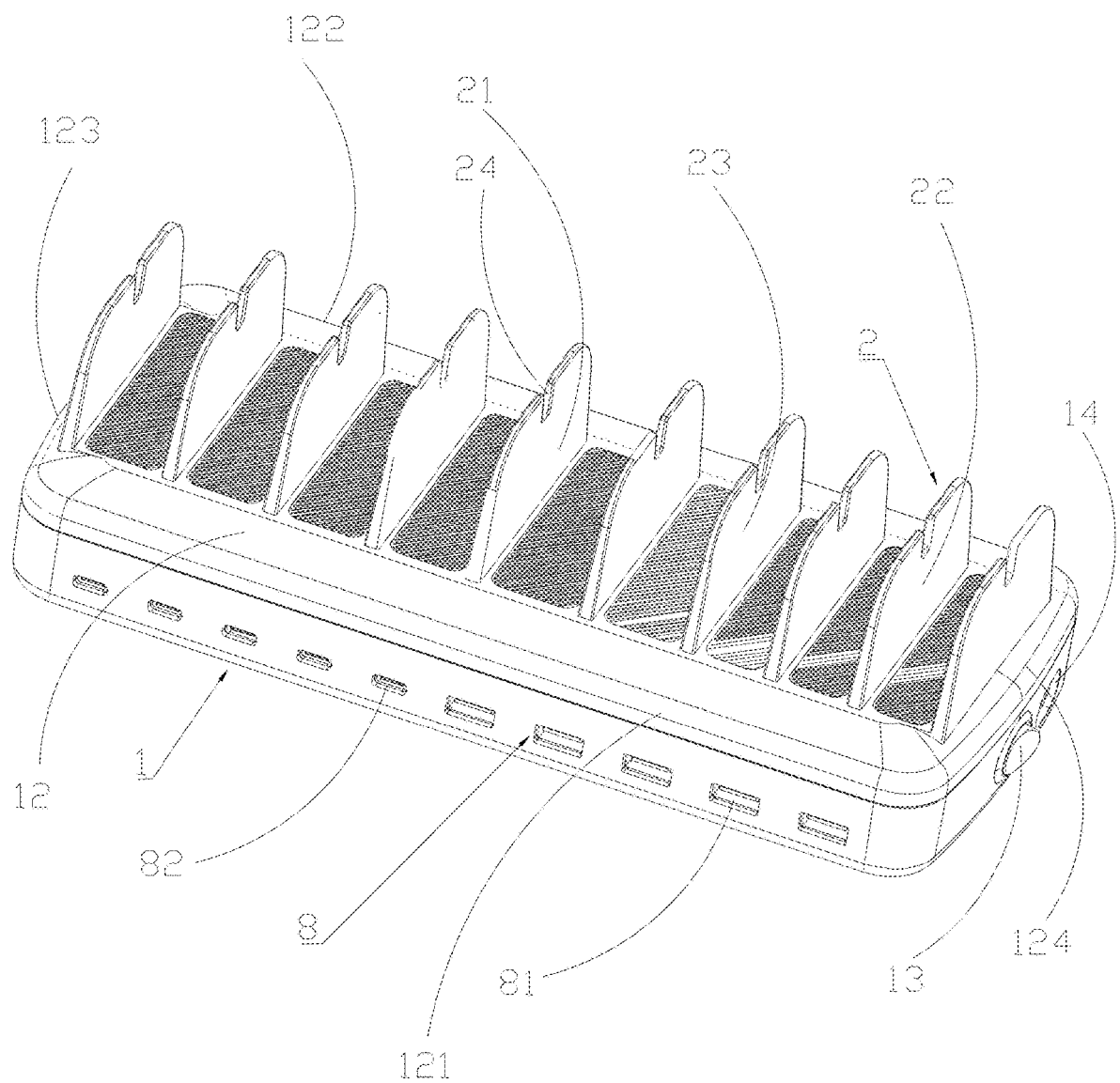
FIG. 1 is an integral structural schematic diagram of the present disclosure.
Figure 2:
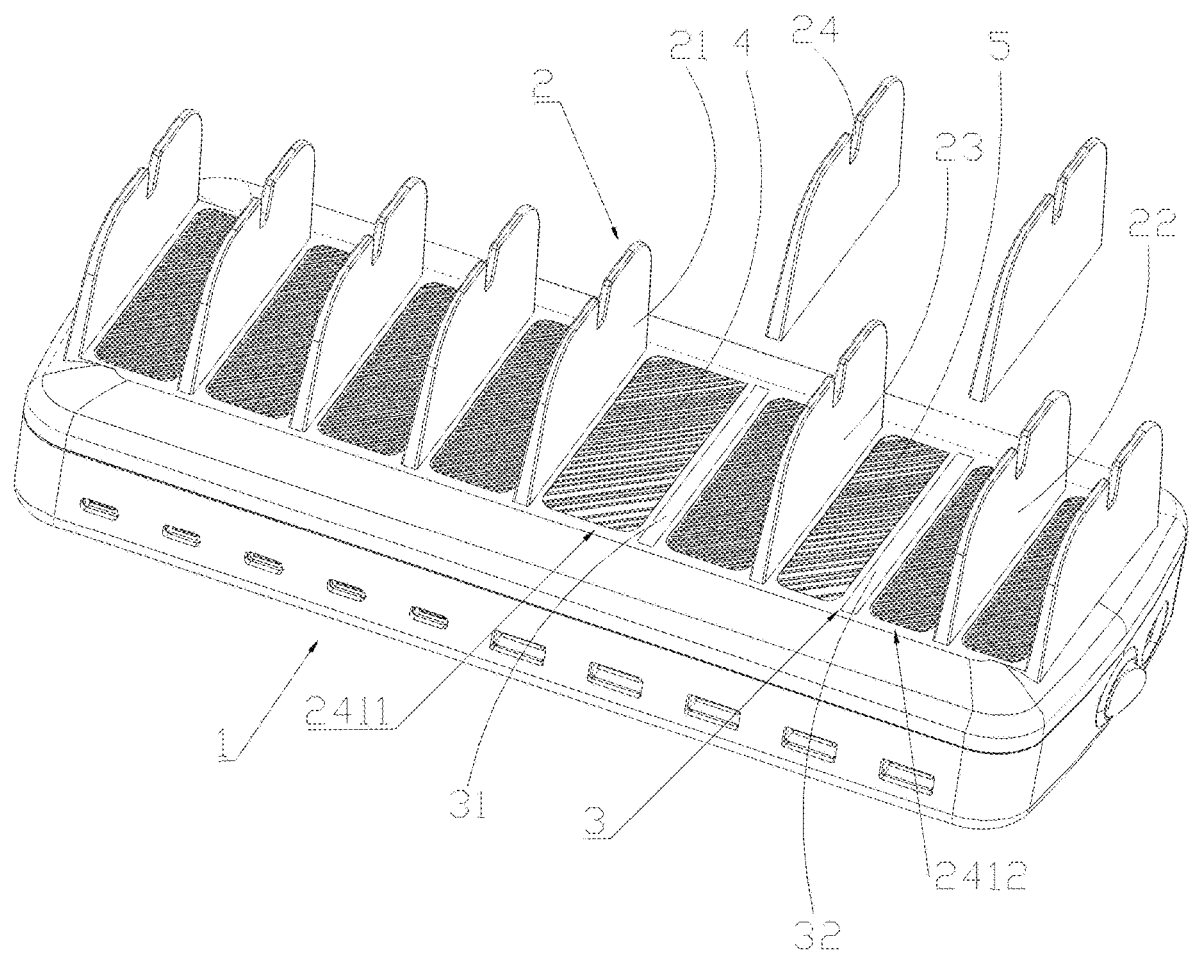
FIG. 2 is another integral structural schematic diagram of the present disclosure.
Figure 3:
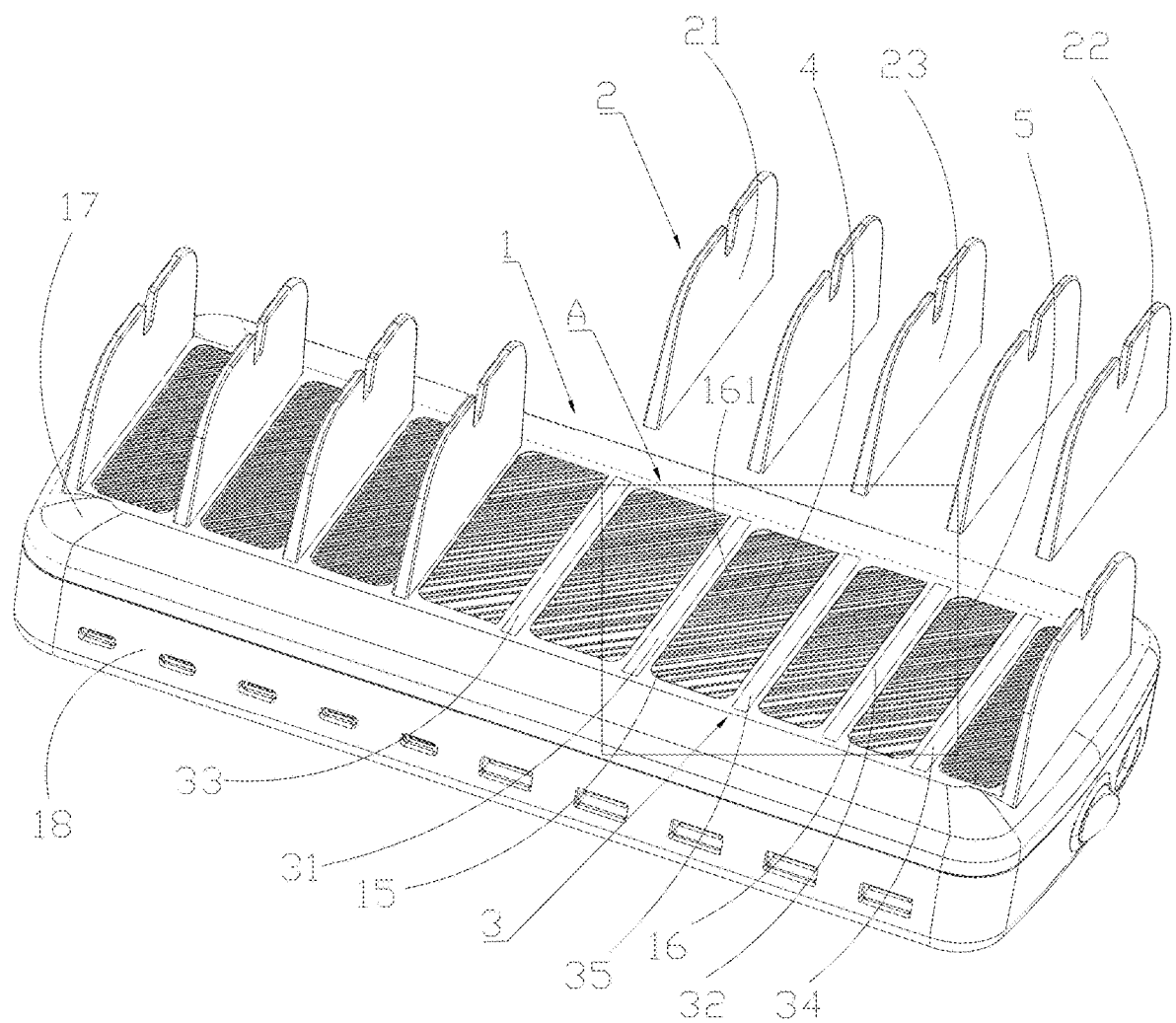
FIG. 3 is another integral structural schematic diagram of the present disclosure.
Figure 4:
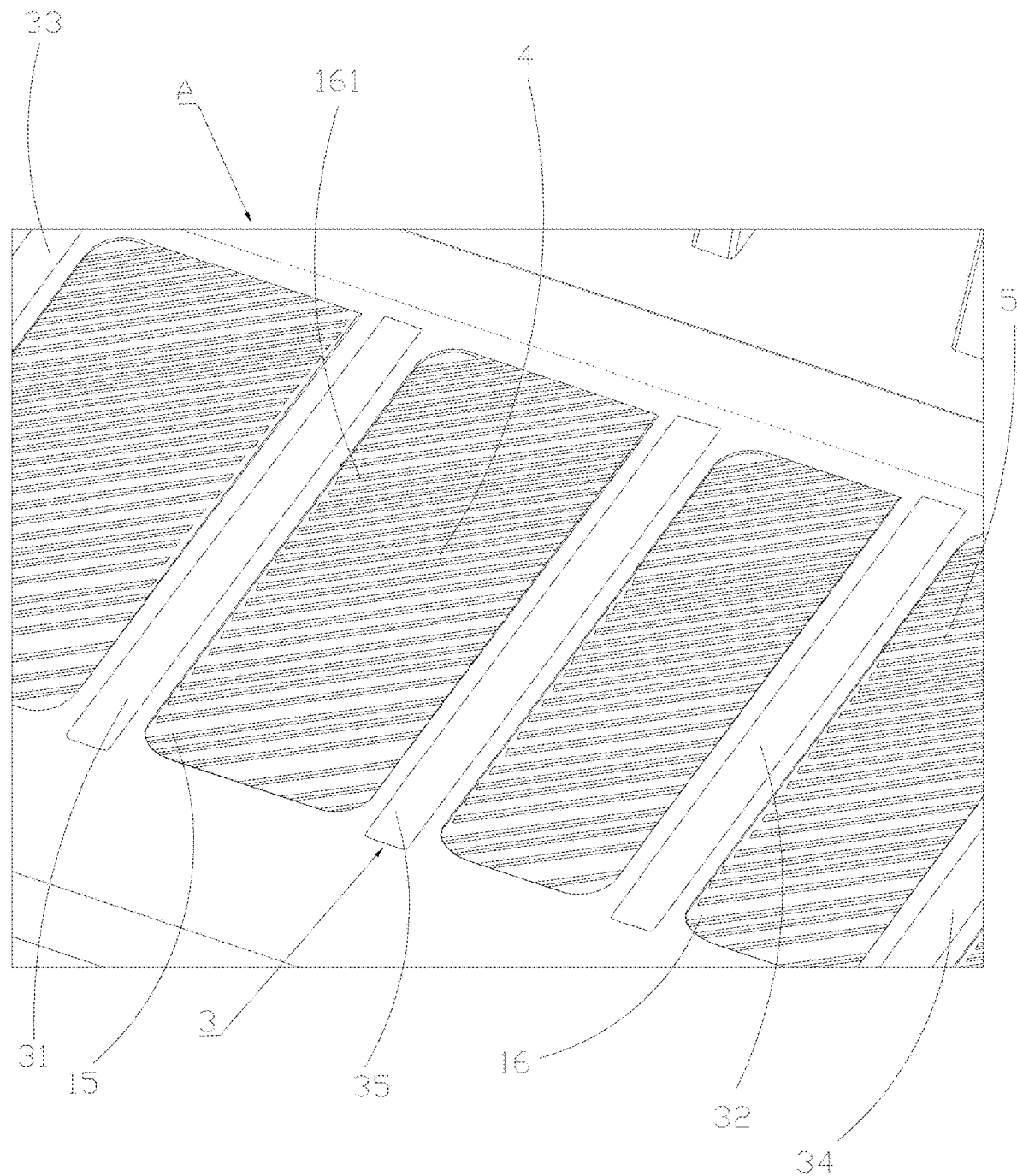
FIG. 4 is an enlarged view at the position of A in FIG. 3.
Figure 5:
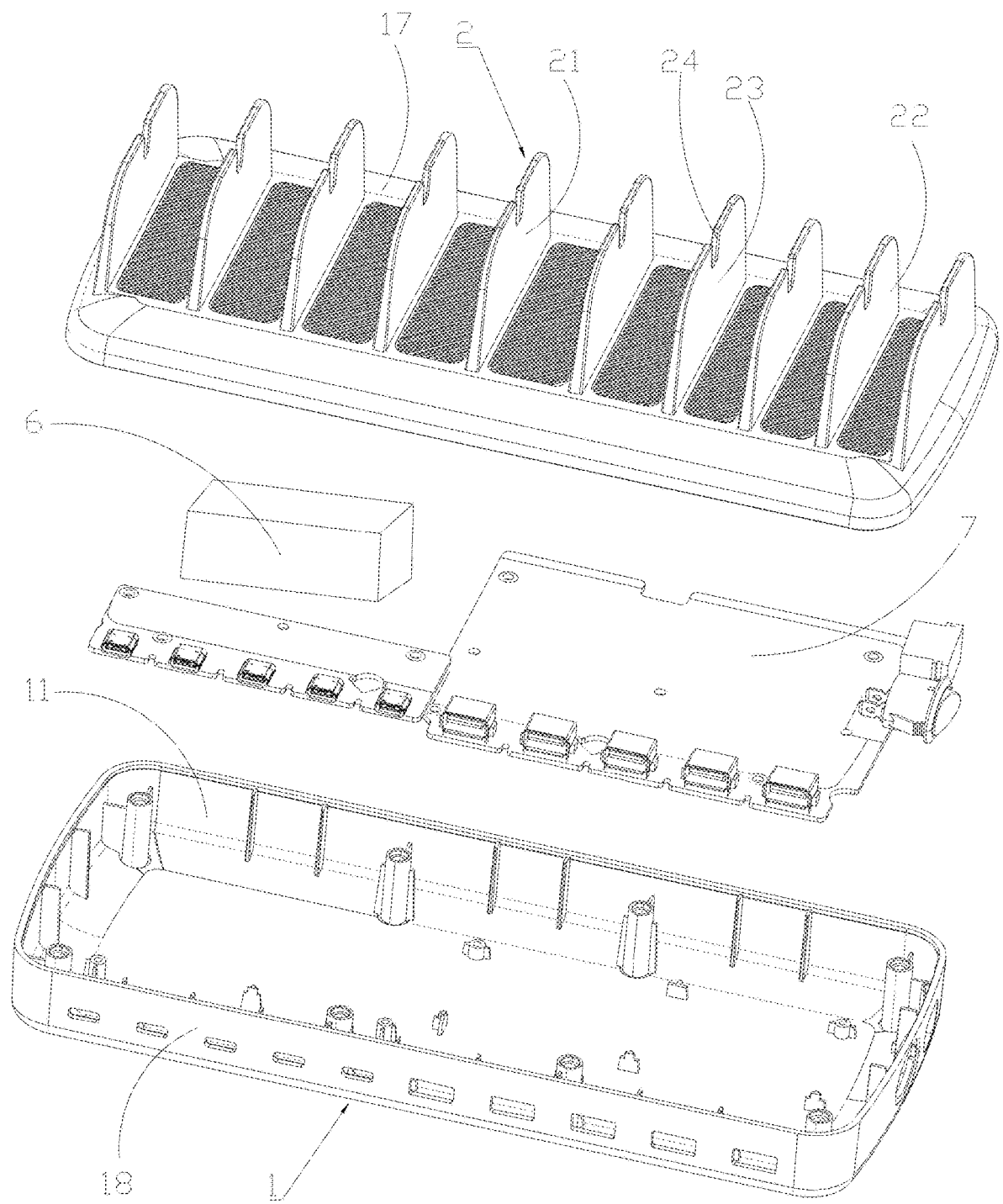
FIG. 5 is an exploded view of the present disclosure.
Figure 6:
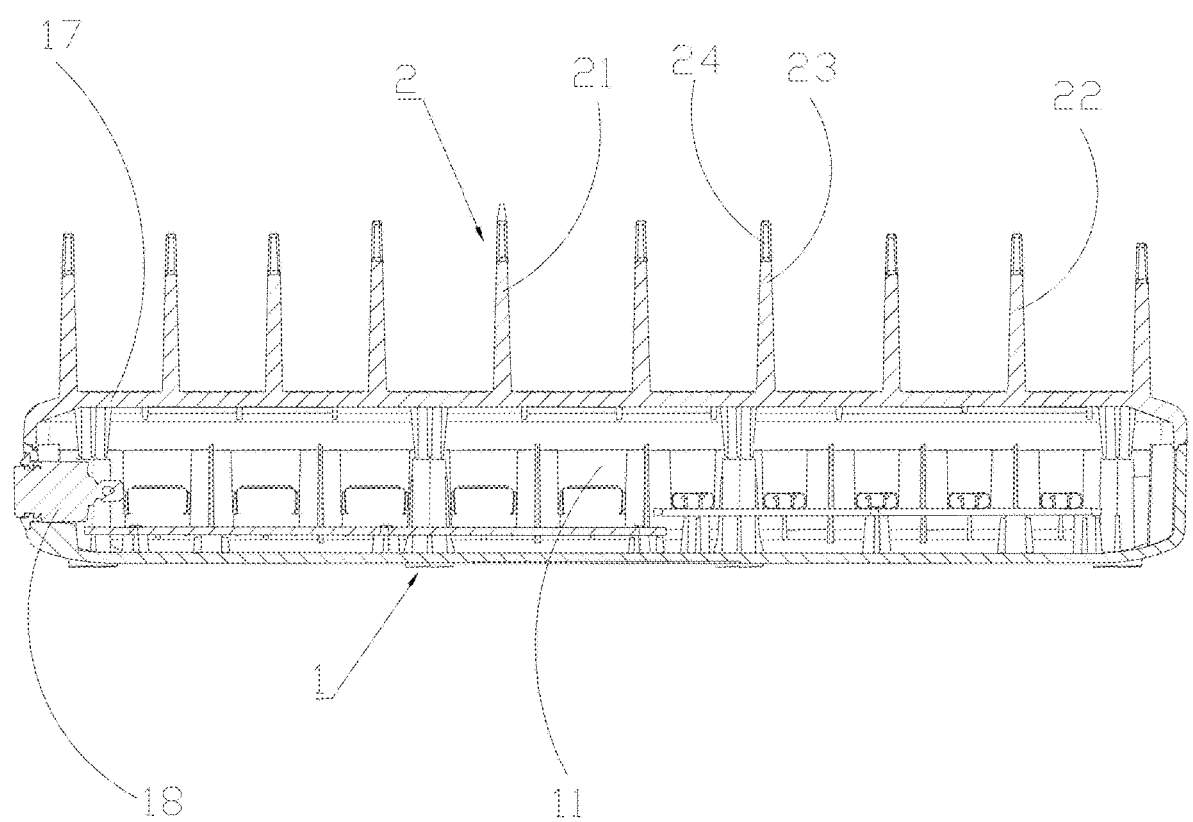
FIG. 6 is a sectioning section view along a charging stand main body and a support baffle portion.

Referring to FIG. 1 to FIG. 6, a charging stand includes:
a charging stand main body 1;
a support baffle portion 2, wherein the support baffle portion 2 includes a first support baffle 21, a second support baffle 22 and a third support baffle 23, and the first support baffle 21 is connected with the charging stand main body 1; the second support baffle 22 is connected with the charging stand main body 1; the third support baffle 23 is connected with the charging stand main body 1, the third support baffle 23 is located between the first support baffle 21 and the second support baffle 22, a first charging placement space 2411 is formed between the third support baffle 23 and the first support baffle 21, and a second charging placement space 2412 is formed between the third support baffle 23 and the second support baffle 22; a first spacing is formed between the third support baffle 23 and the first support baffle 21, a second spacing is formed between the third support baffle 23 and the second support baffle 22, and the first spacing is different from the second spacing.

Through the above-mentioned structure, the charging stand includes a charging stand main body 1 and a support baffle portion 2. The support baffle portion 2 includes a first support baffle 21, a second support baffle 22 and a third support baffle 23, and the first support baffle 21 is connected with the charging stand main body 1. The second support baffle 22 is connected with the charging stand main body 1. The third support baffle 23 is connected with the charging stand main body 1, the third support baffle 23 is located between the first support baffle 21 and the second support baffle 22, a first charging placement space 2411 is formed between the third support baffle 23 and the first support baffle 21, and a second charging placement space 2412 is formed between the third support baffle 23 and the second support baffle 22. A first spacing is formed between the third support baffle 23 and the first support baffle 21, a second spacing is formed between the third support baffle 23 and the second support baffle 22, and the first spacing is different from the second spacing. Thus, electronic equipment can be put in the first charging placement space 2411 and the second charging placement space 2412 by a user, and one or more electronic equipment is convenient for the user to place and accommodate. In addition, since the first spacing is different from the second spacing, different thicknesses and sizes of electronic devices can be placed in the first charging placement space 2411 and the second charging placement space 2412. Further, when the electronic equipment needs to be supported at a certain angle by the user, as the first spacing is different from the second spacing, the support angle of the electronic equipment when being placed in the first charging placement space 2411 is different from that when being placed in the second charging placement space 2412. The support angle of the electronic equipment is adjusted through the first charging placement space 2411 and the second charging placement space 2412 by the user, so that the content displayed in a screen of the electronic equipment is observed at different angles by the user, and the electronic equipment is used by the user when the electronic equipment is charged.

Wherein, the first spacing is smaller than the second spacing, and the spacing ranges of the first spacing and the second spacing are 0.5 mm to 100 mm. Through the structure, charging stand is reasonable in design and simple in structure, and the spacing range is set to be 0.5 mm to 100 mm, so that the charging stand adapts to most electronic equipment on the market, and the universality of the charging stand is greatly improved.

In the embodiment, a baffle mounting portion 3 is arranged on the charging stand main body 1, and the baffle mounting portion 3 is used for mounting the support baffle portion 2. Wherein, the baffle mounting portion 3 includes a plurality of first mounting parts 31, and the first mounting parts 31 are located between the first support baffle 21 and the third support baffle 23. Specifically, the baffle mounting portion 3 also includes a plurality of second mounting parts 32, and the second mounting parts 32 are located between the second support baffle 22 and the third support baffle 23. Further, the first mounting part 31 is a first mounting slot position. Further, the second mounting part 32 is a second mounting slot position. Further, the baffle mounting portion 3 also includes a third mounting part 33, a fourth mounting part 34 and a fifth mounting part 35. The first support baffle 21 is connected with the charging stand main body 35 through the third mounting part 33. The second support baffle 22 is connected with the charging stand main body 1 through the fourth mounting part 34. The third support baffle 23 is connected with the charging stand main body 1 through the fifth mounting part 35. Further, the third mounting part 33 is a third mounting slot position. The fourth mounting part 34 is a fourth mounting slot position. The fifth mounting part 35 is a fifth mounting slot position. The first support baffle 21 is detachably inserted in the third mounting slot position. The second support baffle 22 is detachably inserted in the fourth mounting slot position. The third support baffle 23 is detachably inserted in the fifth mounting slot position. Through the above-mentioned structure, the baffle mounting portion 3 includes a plurality of first mounting parts 31, and the first mounting parts 31 are located between the first support baffle 21 and the third support baffle 23. The baffle mounting portion 3 also includes a plurality of second mounting parts 32, and the second mounting parts 32 are located between the second support baffle 22 and the third support baffle 23. The first mounting part 31 is a first mounting slot position, and the second mounting part 32 is a second mounting slot position, so that the reserved first mounting slot position and the reserved second mounting slot position can be used for inserting the support baffle portion. When more electronic equipment or other sizes of electronic equipment need to be placed, the baffle portion can be inserted in the first mounting slot position and the second mounting slot position to partition the first charging placement space 2411 and the second charging placement space 2412 into a plurality of placement units for charging and placing more electronic equipment or other sizes of electronic equipment. Or, in some embodiments, the spacings among the first support baffle 21, the second support baffle 22 and the third support baffle 23 can also be adjusted by adjusting the insertion slot positions of the first support baffle 21, the second support baffle 22 and the third support baffle 23 to adjust the sizes of the first spacing and the second spacing, so that the charging stand can adapt to more sizes of electronic equipment.

In some embodiments, the first support baffle 21 and the charging stand main body 1 are integrally formed, the second support baffle 22 and the charging stand main body 1 are integrally formed, and the third support baffle 23 and the charging stand main body 1 are integrally formed. Through the above-mentioned structure, the production of the first support baffle 21, the second support baffle 22, the third support baffle 23 and the charging stand 1 is facilitated, and the first spacing and the second spacing can be fixed.

In the embodiment, the height of the third support baffle 23 is different from the height of the first support baffle 21. Wherein, the height of the third support baffle 23 is different from the height of the second support baffle 22. Specifically, the height of the second support baffle 22 is different from the height of the first support baffle 21. Further, the height ranges of the first support baffle 21, the second support baffle 22 and the third support baffle 23 are 1 mm to 100 mm. Through the above-mentioned structure, the height of the third support baffle 23 is different from that of the first support baffle 21, the height of the third support baffle 23 is different from that of the second support baffle 22, and the height of the second support baffle 22 is different from that of the first support baffle 21, so that different heights and sizes of electronic equipment can be placed in the first charging placement space 2411 and the second charging placement space 2412. Further, when the electronic equipment needs to be supported at a certain angle by the user, the electronic equipment is put in the first charging placement space 2411 or the second charging placement space 2412. The electronic equipment can be supported at different angles by the third support baffle 23, the first support baffle 21 and the second baffle, so that the content displayed in the screen of the electronic equipment is observed at different angles by the user, and the electronic equipment is used by the user when the electronic equipment is charged.

In the embodiment, the charging stand main body 1 a plastic charging stand main body 1 or a bamboo charging stand main body 1 or wooden charging stand main body 1 or a metal charging stand main body 1. Through the above-mentioned structure, the plastic charging stand main body 1 or the bamboo charging stand main body 1 or wooden charging stand main body 1 or the metal charging stand main body 1 is convenient to produce, and is long in service life.

In the embodiment, the charging stand also includes a first anti-skid portion 4 and a second anti-skid portion 5. The first anti-skid portion 4 and the second anti-skid portion 5 are both connected with the charging stand main body 1. The first anti-skid portion 4 is arranged between the third support baffle 23 and the first support baffle 21. The second anti-skid portion 5 is arranged between the third support baffle 23 and the second support baffle 22. Wherein, the first anti-skid portion is a first rubber anti-skid portion or a first silicone anti-skid portion or a first plastic anti-skid portion, and the second anti-skid portion is a second rubber anti-skid portion or a second silicone anti-skid portion or a second plastic anti-skid portion. Specifically, the first anti-skid portion 4 and the second anti-skid portion 5 are both detachably connected with the charging stand main body 1. Further, a first mounting groove 15 and a second mounting groove 16 are formed in the charging stand main body 1. The first anti-skid portion 4 is arranged in the first mounting groove 15, and the second anti-skid portion 5 is arranged in the second mounting groove 16. Further, each of the first anti-skid portion 4 and the second anti-skid portion 5 is provided with a plurality of anti-skid bulges 161. Through the above-mentioned structure, the first anti-skid portion 4 and the second anti-skid portion 5 can prevent the electronic equipment from sliding in the first charging placement space 2411 and the second charging placement space 2412. Moreover, the first anti-skid portion 4 and the second anti-skid portion 5 are both detachably connected with the charging stand main body 1 through glue, so that the first anti-skid portion 4 and the second anti-skid portion 5 are convenient to mount.

In some embodiments, the first anti-skid portion 4 and the second anti-skid portion 5 are both integrally formed with the charging stand main body 1. Through the above-mentioned structure, the first anti-skid portion 4, the second anti-skid portion 5 and the charging stand main body 1 are convenient to produce, and the first anti-skid portion 4 and the second anti-skid portion 5 can be prevented from falling off the charging stand main body 1.

In the embodiment, the charging stand also includes a power module 6 and a control main board 7. The power module 6 is electrically connected with the control main board 7. An accommodating cavity 11 is formed around a side wall of the charging stand main body 1, and the power module 6 and the control main board 7 are arranged inside the accommodating cavity 11. A side wall of the charging stand main body 1 is provided with a power output port group 8, and the power output port group 8 is electrically connected with the power module 6 and the control main board 7. Wherein, the power output port group 8 includes a plurality of first power output ports 81 and a plurality of second power output ports 82, and the first power output ports 81 and the second power output ports 82 are different types of power output ports. Specifically, the first power output port 81 is a first USB (Universal Serial Bus) power output port, and the second power output port 82 is a TYPE-C power output port. Through the above-mentioned structure, since the first power output port 81 and the second power output port 82 are different types of power output ports, and the charging stand main body 1 are in a plurality of power input modes, so that the charging stand main body 1 can adapt to different similar charging cables, and input power of the charging stand main body 1 is used for charging different types of electronic equipment.

In the embodiment, the support baffle portion 2 is connected with an upper surface 12 of the charging stand main body 1, and a third spacing is formed between the support baffle portion 2 and a left edge 121 and/or a right edge 122 and/or a front edge 123 and/or a rear edge 124 of the upper surface 12; and the lower side of the support baffle portion 2 is connected with the charging stand main body 1, and a slot 24 is formed in the upper side of the support baffle portion 2. Through the above-mentioned structure, the charging cable can enter the first charging placement space 2411 or the second charging placement space 2412 through the slot 24 to charge the electronic equipment placed in the first charging placement space 2411 or the second charging placement space 2412, and the slot 24 can fix the position of the charging cable so that the charging cable is tidy.

In the embodiment, a side wall of the charging stand main body 1 is also provided with a switch 13, and the switch 13 is electrically connected with the power module 6 and the control main board 7. Further, the side wall of the charging stand main body 1 is also provided with a charging port 14, and the charging port 14 is electrically connected with the power module 6 and the control main board 7. Further, the charging stand main body 1 includes an upper cover 17 and a base 18. The upper cover 17 is detachably connected with the base 18. The support baffle portion 2 is connected with the upper cover 17. The power output port group 8, the charging port 14 and the switch 13 are all arranged on the base 18. Through the above-mentioned structure, the power output port group 8 can be completely turned on or turned off through the switch 13 so as to realize the function of one-key control. Moreover, the charging port 14 is electrically connected with the power module 6 and the control main board 7, the power module 6 can be charged through the charging port 14. Wherein, a plurality of first power output ports and a plurality of second power output ports are sequentially arranged along the side wall of the base.

Referring to FIG. 1 to FIG. 6, a charging stand includes a charging stand main body 1 and a support baffle portion 2. The support baffle portion 2 is fixedly connected to the charging stand main body 1.

Through the above-mentioned structure, due to the fixed connection between the support baffle portion 2 and the charging stand main body 1 is more stable, thereby allowing the support baffle portion 2 to more securely support electronic devices placed on the charging stand main body 1.

In the embodiment, the support baffle portion 2 is fixedly connected to the charging stand main body 1 through integrated molding; or, the support baffle portion 2 is fixedly connected to the charging stand main body 1 though gluing.

In some embodiments, the support baffle portion 2 is fixedly connected to the charging stand main body 1 through welding, the support baffle portion 2 is fixedly connected to the charging stand main body 1 though ultrasonic welding.

Through the above-mentioned structure, the effectively achieves
a fixed connection between the support baffle portion 2 and the charging stand main body 1, the support baffle portion 2 can more securely support electronic devices placed on the charging stand main body 1, preventing the electronic equipment from slipping off the charging stand main body 1.

Figure 7:
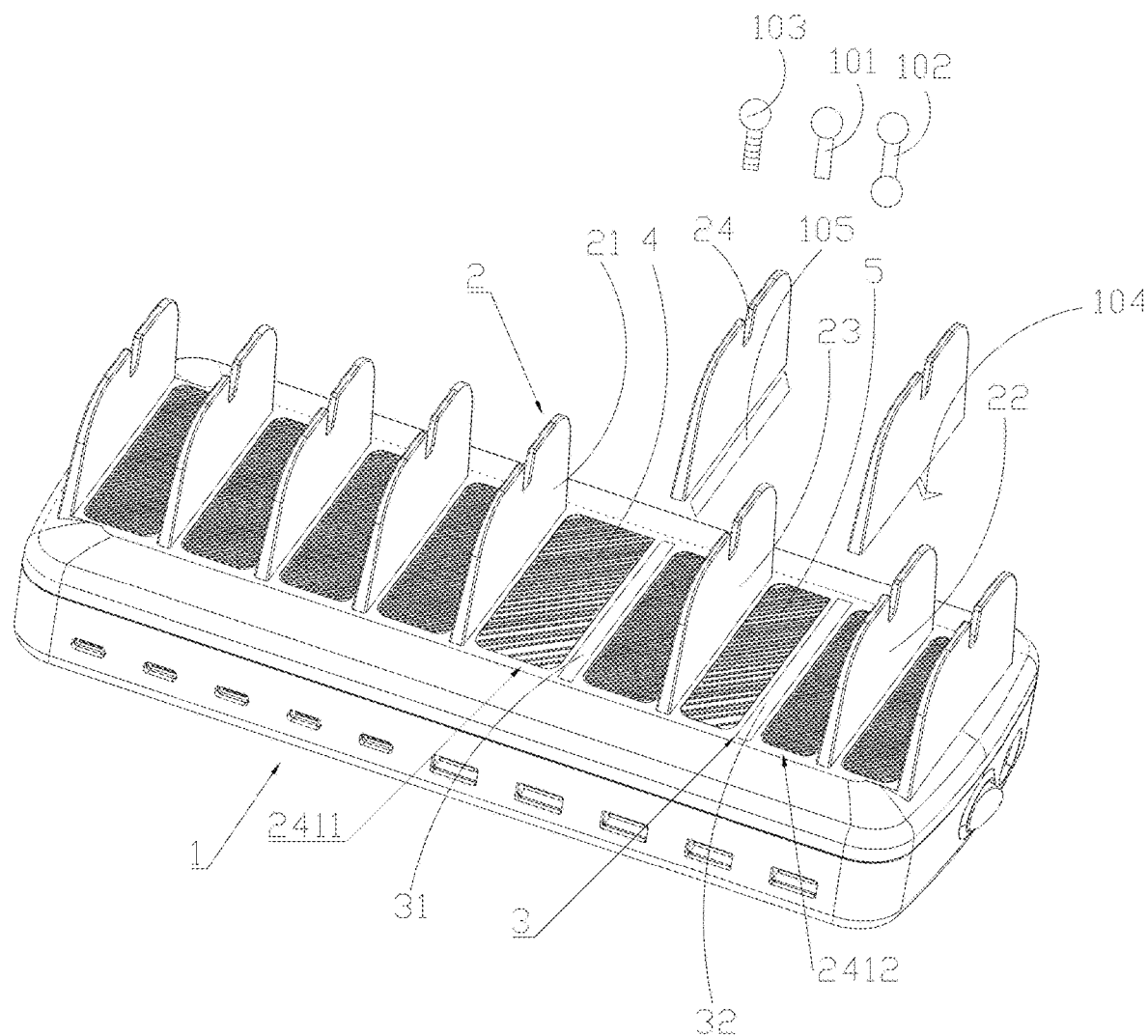
FIG. 7 is a schematic view of screws, bolts, rivets, snap-fits, and magnetic elements of the charging stand main body of the present invention.

Referring to FIG. 1 to FIG. 7, a charging stand includes a charging stand main body 1 and a support baffle portion 2. The support baffle portion 2 is detachably connected to the charging stand main body 1.

Through the above-mentioned structure, the support baffle portion 2 is detachably connected to the charging stand main body 1, this connection allows users to easily install or remove the support baffle portion 2 based on actual usage needs. For example, when support required, the support baffle portion 2 can be mounted on the charging stand main body 1, when storage or transport of the charging base is necessary, the support baffle portion 2 can be detached the charging stand main body 1 reduce the charging base volume, facilitating easier storage and transport of charging base. Furthermore, sine the support baffle portion 2 is detachably connected to the charging stand main body 1, the support baffle portion position 2 can be adjusted, allowing for modifications to the supporting position of the support baffle portion 2.

In the embodiment, the support baffle portion 2 is detachably connected to the charging stand main body 1 through magnetic attachment, wherein the support baffle portion 2 is magnetically to the charging stand main body 1 of the charging base though magnetic connector 105, the magnetic connector is specifically a magnet, or, the support baffle portion 2 may be detachably connected to the charging stand main body 1 using bolts 101, rivets 102, or screws 103; or, the support baffle portion 2 is detachably connected to the charging stand main body 1 through buckles 104.

Through the above-mentioned structure, the detachably connected between the support baffle portion 2 and the charging stand main body 1 is effectively realized, to facilitate the support baffle portion 2 in providing support to electronic devices placed on the charging stand main body 1 at various selected position.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A charging stand, comprising:
a charging stand main body (1); and
a support baffle portion (2), wherein the supporting baffle portion (2) is fixedly connected to the charging stand main body, and
wherein the support baffle portion (2) comprises a first support baffle (21), a second support baffle (22) and a third support baffle (23), the first support baffle (21) is connected with the charging stand main body (1); the second support baffle (22) is connected with the charging stand main body (1); the third support baffle (23) is connected with the charging stand main body (1), the third support baffle (23) is located between the first support baffle (21) and the second support baffle (22), a first charging placement space (2411) is formed between the third support baffle (23) and the first support baffle (21), a second charging placement space (2412) is formed between the third support baffle (23) and the second support baffle (22), and a height of the third support baffle (23) is different from a height of the first support baffle (21).

2. The charging stand according to claim 1, wherein the support baffle portion (2) is fixedly connected to the charging stand main body (1) through integrated molding; or, the support baffle portion (2) is fixedly connected to the charging stand main body (10 through gluing.

3. The charging stand according to claim 1, wherein the support baffle portion (2) is fixedly connected to the charging stand main body (1) through welding.

4. The charging stand according to claim 3, wherein the support baffle portion (2) is fixedly connected to the charging stand main body (1) though ultrasonic welding.

5. The charging stand according to claim 1, wherein a first spacing distance is formed between the third support baffle (23) and the first support baffle (21), a second spacing distance is formed between the third support baffle (23) and the second support baffle (22), and the first spacing distance is different from the second spacing distance.

6. The charging stand according to claim 5, wherein the first spacing distance is smaller than the second spacing distance, and spacing ranges of the first spacing distance and the second spacing distance are 0.5 mm to 100 mm.

7. The charging stand according to claim 1, wherein a baffle mounting portion (3) is arranged on the charging stand main body (1), and the baffle mounting portion (3) is used for mounting the support baffle portion (2).

8. The charging stand according to claim 7, wherein the baffle mounting portion (3) comprises a plurality of first mounting parts (31), the first mounting parts (31) are located between the first support baffle (21) and the third support baffle (23), and the first mounting part (31) is a first mounting slot position.

9. The charging stand according to claim 8, wherein the baffle mounting portion (3) also comprises a plurality of second mounting parts (32), the second mounting parts (32) are located between the second support baffle (22) and the third support baffle (23), the second mounting part (32) is a second mounting slot position, wherein the baffle mounting portion (3) also comprises a third mounting part (33), a fourth mounting part (34) and a fifth mounting part (35), the first support baffle (21) is connected with the charging stand main body (35) through the third mounting part (33), the second support baffle (22) is connected with the charging stand main body (1) through the fourth mounting part (34), the third support baffle (23) is connected with the charging stand main body (1) through the fifth mounting part (35), and the third mounting part (33), the fourth mounting part (34) and the fifth mounting part (35) are a third mounting slot position, a fourth mounting slot position, and a fifth mounting slot position respectively.

10. The charging stand according to claim 1, wherein the first support baffle (21) and the charging stand main body (1) are integrally formed, the second support baffle (22) and the charging stand main body (1) are integrally formed, and the third support baffle (23) and the charging stand main body (1) are integrally formed.

11. The charging stand according to claim 1, wherein the height of the third support baffle (23) is different from a height of the second support baffle (22).

12. The charging stand according to claim 11, wherein the height of the second support baffle (22) is different from the height of the first support baffle (21).

13. The charging stand according to claim 1, wherein the charging stand main body (1) is a plastic charging stand main body (1), a bamboo charging stand main body (1), a wooden charging stand main body (1) or a metal charging stand main body (1).

14. The charging stand according to claim 1, also comprising a first anti-skid portion (4) and a second anti-skid portion (5), wherein the first anti-skid portion (4) and the second anti-skid portion (5) are both connected with the charging stand main body (1), the first anti-skid portion (4) is arranged between the third support baffle (23) and the first support baffle (21), and the second anti-skid portion (5) is arranged between the third support baffle (23) and the second support baffle (22); wherein the height ranges of the first support baffle (21), the second support baffle (22) and the third support baffle (23) are 1 mm to 100 mm.

15. The charging stand according to claim 1, also comprising a power module (6) and a control main board (7), wherein the power module (6) is electrically connected with the control main board (7); an accommodating cavity (11) is formed around a side wall of the charging stand main body (1), and the power module (6) and the control main board (7) are arranged inside the accommodating cavity (11); a side wall of the charging stand main body (1) is provided with a power output port group (8), and the power output port group (8) is electrically connected with the power module (6) and the control main board (7);

wherein the power output port group (8) comprises a plurality of first power output ports (81) and a plurality of second power output ports (82), and the first power output ports (81) and the second power output ports (82) are different types of power output ports;

wherein the first power output port (81) is a first USB (Universal Serial Bus) power output port, and the second power output port (82) is a TYPE-C power output port; and wherein the charging stand main body (1) comprises a front edge (121), a rear edge (122) opposite to the front edge (121), two side edges (123,124) connected between the front edge (121) and the rear edge (124) and an upper surface (12), the support baffle portion (2) is disposed on the upper surface (12), the power output port group (8) are disposed on the front edge (121), and a button is disposed on one of the two side edges (124).

16. The charging stand according to claim 1, wherein the support baffle portion (2) is connected with an upper surface (12) of the charging stand main body (1), and a third spacing is formed between the support baffle portion (2) and a left edge (121) and/or a right edge (122) and/or a front edge (123) and/or a rear edge (124) of the upper surface (12); and a lower side of the support baffle portion (2) is connected with the charging stand main body (1), and a slot (24) is formed in an upper side of the support baffle portion (2).

17. A charging stand, comprising:
a charging stand main body (1); and
a support baffle portion (2), wherein the supporting baffle portion (2) is fixedly connected to the charging stand main body, the support baffle portion (2) comprises at least one support baffle, the baffle mounting portion (3) comprises at least one mounting slot position, and the at least one support baffle is inserted in the at least one mounting slot position.

18. The charging stand according to claim 17, wherein the at least one support baffle comprises a first support baffle (21), a second support baffle (22) and a third support baffle (23), the baffle mounting portion (3) comprises a plurality of first mounting slot positions (31), a plurality of second mounting slot positions (32), a third mounting slot position (33), a fourth mounting slot position (34) and a fifth mounting slot position (35), the first support baffle (21) is connected with the charging stand main body (35) through the third mounting slot position (33), the second support baffle (22) is connected with the charging stand main body (1) through the fourth mounting slot position (34), and the third support baffle (23) is connected with the charging stand main body (1) through the fifth mounting slot position (35).

19. A charging stand, comprising:
a charging stand main body (1); and
a support baffle portion (2),
wherein the supporting baffle portion (2) is fixedly connected to the charging stand main body, and
wherein the support baffle portion (2) comprises a first support baffle (21), a second support baffle (22) and a third support baffle (23), and the first support baffle (21) is connected with the charging stand main body (1); the second support baffle (22) is connected with the charging stand main body (1); the third support baffle (23) is connected with the charging stand main body (1), the third support baffle (23) is located between the first support baffle (21) and the second support baffle (22), a first charging placement space (2411) is formed between the third support baffle (23) and the first support baffle (21), a second charging placement space (2412) is formed between the third support baffle (23) and the second support baffle (22),
wherein a plurality of anti-skid bulges (161) are disposed on the charging stand main body (1) and located between two adjacent support baffles of the first support baffle (21), the second support baffle (22), and the third support baffle (23).

\* \* \* \* \*